United States Patent
Gutiérrez Diez et al.

(10) Patent No.: US 9,120,407 B2
(45) Date of Patent: Sep. 1, 2015

(54) SELF-SUPPORTED CUSHION ASSEMBLY FOR AN INTERIOR VEHICLE PART

(71) Applicant: GRUPO ANTOLIN-INGENIERIA, S. A, Burgos (ES)

(72) Inventors: Héctor Gutiérrez Diez, Burgos (ES); Adelaida Antolin Fernández, Burgos (ES); Omar Lugo Rodriguez, Burgos (ES)

(73) Assignee: GRUPO ANTOLIN-INGENIERIA, S.A., Burgos (ES)

( * ) Notice: Subject to any disclaimer, the term of this patent is extended or adjusted under 35 U.S.C. 154(b) by 0 days.

(21) Appl. No.: 13/955,922

(22) Filed: Jul. 31, 2013

(65) Prior Publication Data

US 2014/0077524 A1    Mar. 20, 2014

(30) Foreign Application Priority Data

Sep. 14, 2012  (EP) .................................... 12382355

(51) Int. Cl.
 *B60N 2/46* (2006.01)
 *B60N 2/70* (2006.01)

(52) U.S. Cl.
 CPC *B60N 2/46* (2013.01); *B60N 2/466* (2013.01); *B60N 2/7017* (2013.01)

(58) Field of Classification Search
 CPC .................................. B60N 2/70; B60N 2/466
 USPC ................................................... 296/153, 1.09
 See application file for complete search history.

(56) References Cited

U.S. PATENT DOCUMENTS

| | | | | |
|---|---|---|---|---|
| 3,770,318 A * | 11/1973 | Fenton | .................... | 297/452.47 |
| 5,183,314 A * | 2/1993 | Lorbiecki | ................ | 297/440.22 |
| 5,564,144 A | 10/1996 | Weingartner et al. | | |
| 5,589,245 A * | 12/1996 | Roell | .............. | 428/85 |
| 8,632,117 B1 * | 1/2014 | Sanchez Cruz et al. | ...... | 296/153 |
| 8,820,815 B2 * | 9/2014 | Krenz et al. | ................ | 296/65.01 |
| 2005/0200161 A1 | 9/2005 | Reed et al. | | |
| 2006/0200960 A1 | 9/2006 | Reed et al. | | |
| 2008/0209638 A1 * | 9/2008 | Unger | ................ | 5/636 |

FOREIGN PATENT DOCUMENTS

DE    4438018    5/1995

OTHER PUBLICATIONS

European Search Report corresponding to EP 12382355.1 dated Jan. 25, 2013.

* cited by examiner

*Primary Examiner* — Dennis H Pedder
(74) *Attorney, Agent, or Firm* — Banner & Witcoff, Ltd.

(57) ABSTRACT

Self-supported cushion assembly for an interior vehicle part which comprises a tridimensional fabric, a rigid plate and a main frame. The tridimensional fabric is the element which simultaneously performs a structural function in order to support any effort commonly exerted on the self-supported cushion assembly during its normal use, a cushion function, and decorative function of the self-supported cushion assembly. The frame assembly transmits the efforts to the interior vehicle part and links the self-supported cushion assembly to the interior vehicle part. Depending on the case, the frame assembly can comprise a part of the frame of the interior vehicle part, an additional frame part or both of them.

19 Claims, 5 Drawing Sheets

SELF-SUPPORTED CUSHION ASSEMBLY FOR AN INTERIOR VEHICLE PART

The present application is a U.S. National Phase Application Under 35 U.S.C. §371 and applicant herewith claims the benefit of priority of EP 12382355.1 filed Sep. 14, 2012 which is incorporated by reference herein in its entirety.

TECHNICAL FIELD

The present invention refers to a self-supported cushion assembly for an interior vehicle part having a tridimensional fabric as main cushion element.

BACKGROUND

It is quite common to find inside the vehicles several parts which comprise a cushion device in order to improve the vehicle user's comfort.

Said interior vehicle parts are used as support elements by the vehicle user, for example, an armrest of a door trim panel which supports the vehicle user's arm.

For that reason, this kind of parts commonly has one or more cushion elements as part of its structure, for example a foam element or similar.

On the other hand, said interior vehicle parts apart from comprising a support element which support the efforts derived from the normal use and from its attaching, they need to have a decorative element which offers an attractive appearance due to they are visible to the occupants inside the vehicle interior.

Therefore, these interior vehicle parts have three main functions, a supporting efforts function, a cushion function and decorative function.

Normally, the structure of those interior vehicle parts comprise a different element in order to fulfill each of the functions described above, that is, one element as support efforts element, a second element as cushion element and a third element as decorative element.

This, apart from complicating and making expensive the structure of the interior vehicle part, it has a negative effect on the weight of it.

On the other hand, normally said interior vehicle parts which have a cushion function, have uniform rigidity along the whole interior vehicle part because said interior vehicle parts do not allow to locally control its rigidity depending on the functions demanded to such interior vehicle parts. For example it should not behave in the same way the area of the armrest where the elbow is supported than the area of the armrest where the forearm is supported.

Therefore it is desirable to find a self-supported cushion element with a simpler structure, lighter and that allow to control the rigidity of the cushion element in a localized way.

Interior vehicle parts which have a cushion function normally comprise a laminate formed by a support element, a cushion element and a decorative element which finishes the structure.

Those structures are complicated and expensive due to the number of elements which form part of them and to the manufacturing process of such structures.

On the other hand this kind of structures is heavy due to the number of elements comprised by them and their weight.

Apart from this, known structures do not allow to control the rigidity of the cushion element in a localized way.

American patents US2005200161 and US2006200960 disclose interior vehicle parts according to that described above.

BRIEF SUMMARY

In view of the above described, this invention refers to a self-supported cushion assembly for an interior vehicle part comprising a tridimensional fabric assembled to a frame assembly, the tridimensional fabric comprising:

A structural knitted layer attached to the frame assembly and tightened in order to support any effort commonly exerted on the self-supported cushion assembly during its normal use, A shaping knitted layer attached to the frame assembly in order to shape the self-supported cushion assembly, A core layer having spacer yarns which connect the shaping knitted layer with the structural knitted layer, all of them knitted together as a sole element, the tridimensional fabric has attaching means in order to attach it to the frame assembly, wherein, the structural knitted layer is attached to the frame assembly with a tightening stress T1, the shaping knitted layer is attached to the frame assembly with a shaping stress T2 wherein T1 is greater than T2.

The stresses of the structural knitted layer and of the shaping knitting layer, T1 and T2, are the stresses that these two layers have once they have been attached to the frame assembly and not to the stresses used to attach the two layers to the frame assembly.

Due to the configuration of the invention it is possible to integrate more than one function using less elements than in known cushioned interior vehicle parts of the prior art. This way, the tridimensional fabric acts at the same time as structural element, as cushion element and as decorative element.

This configuration implies a lighter and cheaper structure than those of known cushion structures of the prior art based on foams and lining covers and it also implies a mounting simplification of the self-supported cushion assembly as well.

Optionally, it is possible to control the rigidity of the tridimensional fabric which forms part of the self-supported cushion assembly in a locally way by acting on its features, that is the features of the shaping knitted layer, of the core layer, of the structural knitted layer or of any of them.

BRIEF DESCRIPTION OF THE DRAWINGS

This specification is supplemented with a set of drawings illustrating the preferred embodiments, which are never intended to limit the current invention.

FIG. 11 additionally shows a second frame mounted on the frame assembly in order to apply additional stress to the tridimensional fabric.

FIG. 12 additionally shows a second frame mounted on the frame assembly in order to apply additional stress to the tridimensional fabric.

DETAILED DESCRIPTION OF THE PREFERRED EMBODIMENTS

Figure 1:
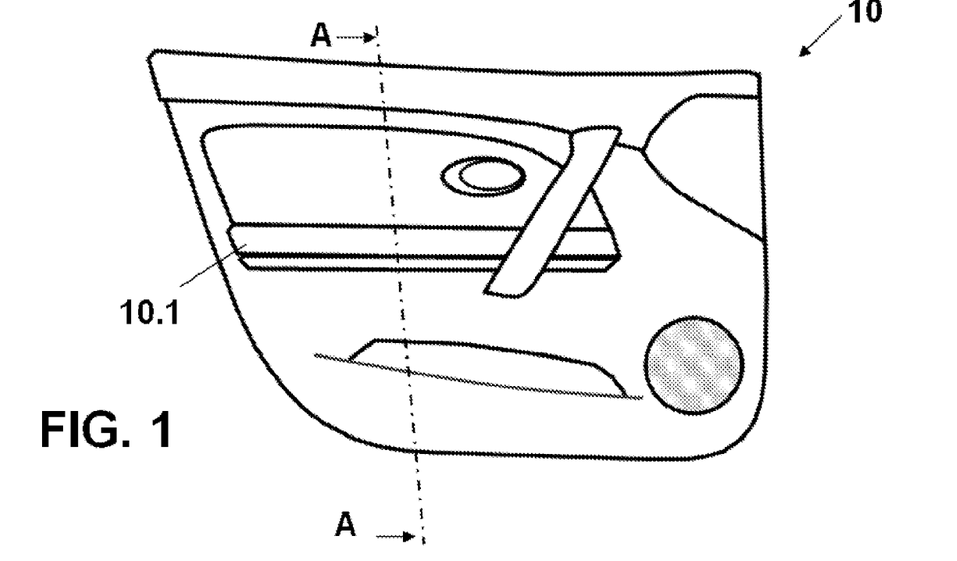
FIG. 1 shows a full view of a vehicle interior part where the interior vehicle part is a door panel.
Figure 2:
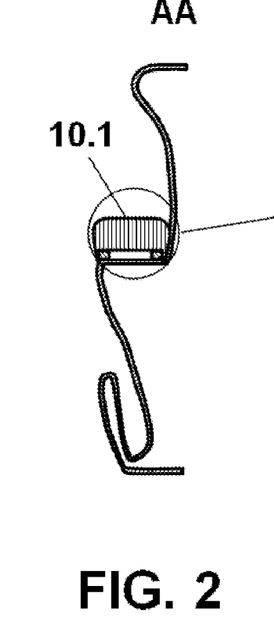
FIG. 2 shows a schematic view according to the section AA corresponding to the door trim panel having a cushioned armrest.

A self-supported cushion assembly (1) is mounted on a vehicle interior part, in this particular embodiment as it can be seen in FIGS. 1 and 2, the self-supported cushion assembly is mounted on a door trim panel (10) and particularly on the armrest (10.1) of the door trim panel (10), and therefore in this particular embodiment the interior vehicle part is the armrest (10.1) of the door trim panel (10).

Other cushioned interior vehicle parts could be suitable for mounting the self-supported cushion assembly (1) of the invention such as dashboards, rear shelves, pillars, seat backrests, sunvisors, etc.

Figure 3:
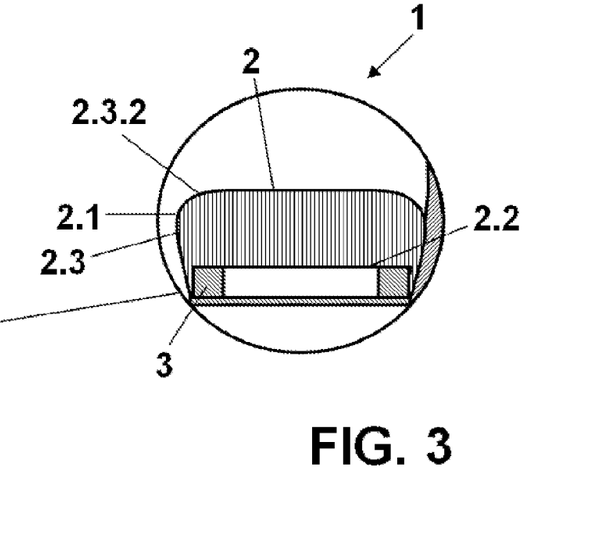
FIG. 3 shows a schematic view in detail of the cushioned armrest according to the section AA, said cushioned armrest having a structure formed by a tridimensional fabric and a frame assembly where is also appreciated the different layers which form part of the tridimensional fabric, in particular, a shaping knitted layer forming the top of the tridimensional fabric, a structural knitted layer forming the bottom of the tridimensional fabric and a core layer formed by spacer yarns which connect the structural knitted layer to the shaping knitted layer in such a way that said three layers are knitted all together as a sole element.

As it can be seen in FIG. 3, the main structure of the self-supported cushion assembly (1) comprises a tridimensional fabric (2) and a frame assembly (3).

The tridimensional fabric (2) is the element which simultaneously performs a structural function in order to support any effort commonly exerted on the self-supported cushion assembly during its normal use, a cushion function, and decorative function, of the self-supported cushion assembly (1).

The tridimensional fabric (2) is attached to the frame assembly (3) by attaching means (5) with a specific stress level given that said tridimensional fabric (2) is not supported on any other element.

The attaching means (5) can be selected among known fixing element of the prior art such as profiles, clips, infrared, ultrasound, hooks, and peripheral frame and reinforcing holes.

In a preferred embodiment, the tridimensional fabric (2) before being attached to the frame assembly (3) has a thickness greater than 20 mm as such, that is greater than what is commonly used in the tridimensional fabrics for other known applications of the prior art.

This specific feature of the tridimensional fabric (2) is particularly advantageous for those cases in which comfort is a key target either when a part of an occupant body lays on the self-supported cushion assembly for long periods of time or to soften light impacts of the occupant body on it.

On the other hand this increased thickness avoids undesirable effects such as uncomfortable rebounding of the part of the user body supported on the self-supported cushion assembly.

The other element which comprises the main structure of the self-supported cushion assembly (1) is the frame assembly (3). The frame assembly (3) transmits the efforts to the interior vehicle part (10) and links the self-supported cushion assembly to the interior vehicle part (10).

As it will be shown below, depending on the case, the frame assembly (3) can comprise a part (30) of the frame of the interior vehicle part (10.1), an additional frame part (300) or both of them.

In the case when the frame assembly (3) comprises an additional frame part (300), said additional frame part is attached to the part (30) of the frame of the interior vehicle part (10.1) by known means in the prior art such as screwing, clamping, riveting, clipping, etc.

Figure 11:
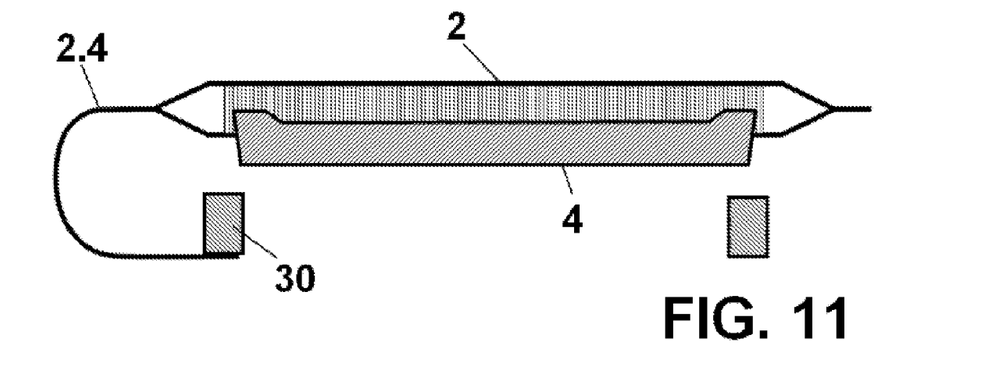
FIG. 11 shows a schematic view in section of the self-supported cushion assembly where it can be appreciated a sixth way of attaching of the tridimensional fabric to the rest of elements which form part of the self-supported cushion assembly. In this particular option, a first sole edge is attached to a part of the frame of the interior vehicle part, where said first sole edge comprises an edge of the shaping knitted layer and an edge of the structural knitted layer joined together. Therefore in this option, the frame assembly comprises a part of the frame of the interior vehicle part.
Figure 12:
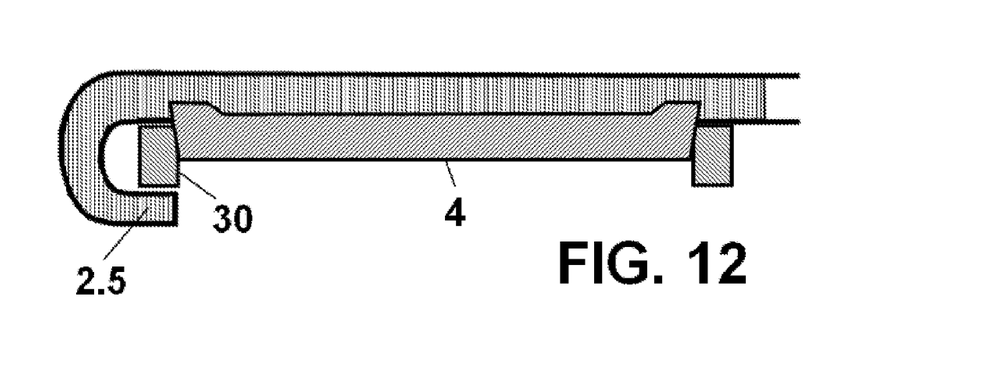
FIG. 12 shows a schematic view in section of the self-supported cushion assembly where it can be appreciated a seventh way of attaching of the tridimensional fabric to the rest of elements which form part of the self-supported cushion assembly. In this particular option, a second sole edge is attached to a part of the frame of the interior vehicle part, where said second sole edge comprises an edge of the shaping knitted layer, an edge of the core layer and an edge of the structural knitted layer joined together. Therefore in this option, the frame assembly comprises a part of the frame of the interior vehicle part.

Additionally, a second frame (4), as it can be seen in FIGS. 11 and 12 can be mounted on the frame assembly (3) in order to apply an additional stress to the tridimensional fabric (2) where said additional stress is modifiable by varying the relative position of the second frame (4) with regard to the frame assembly (3).

In some special cases, a support element (not represented) can be assembled between the tridimensional fabric (2) and the frame assembly (3) in order to locally reinforce the tridimensional fabric (2).

The tridimensional fabric (2), as it can be seen in FIG. 3, is formed by three layers knitted all together as a sole element, particularly a structural knitted layer (2.2) which is tightened in order to support any effort commonly exerted on the self-supported cushion assembly during its normal use, a shaping knitted layer (2.1) which forms the external side visible to the occupants of the self-supported cushion assembly (1) and a core layer (2.3), sandwiched between the shaping knitted layer and the back knitted layer, which has spacer yarns (2.3.2) which connect the structural knitted layer (2.2) with the shaping knitted layer (2.1).

Both structural knitted layer (2.2) and shaping knitted layer (2.1) are attached to the frame assembly (3).

However each layer (2.1, 2.2) is attached to the frame assembly (3) with different stresses, T1 and T2 respectively, where the stress T1 which has the structural knitted layer (2.2) once it has been attached to the frame assembly (3) is greater than the stress T2 which has the shaping knitted layer (2.2) once it has been attached to the frame assembly (3) too.

To support any effort commonly exerted on the self-supported cushion assembly (1) during its normal use, the structural knitted layer (2.2) is only peripherally attached to the frame assembly (3) in such a way the tridimensional fabric (2) is not supported by any other element apart from the frame assembly (3).

However shaping knitted layer (2.1) only fulfills an aesthetic function, by shaping the self-supported cushion assembly, therefore the stress used to tighten said shaping knitted layer is enough to keep a good appearance of the self-supported cushion assembly (1).

Optionally, the shaping knitted layer (2.1) can have an additional finishing treatment by screen printing, ink printing, polyurethane or silicone spraying, flocking, or by a combination of any of these methods on specific areas in order to modify or to improve its external appearance or toughness.

Optionally, it is possible to define different finishing areas (2.1.2) by applying any of the different finishing methods to the shaping knitted layer (2.1). This way, more than one finishing area (2.1.2) can be defined on the shaping knitted layer (2.1) by using one or more of the techniques described above, in order to divide the shaping knitted layer (2.1) into more than one finishing area (2.1.2).

On the other hand, the shaping knitted layer (2.1) may also have different finishing areas (2.1.2) with different features by, using different knitting, by using different spacer yarn material or both of them.

Like the shaping knitted layer (2.1) both, the structural knitted layer (2.2) and the core layer (2.3), may have different features at specific areas, for example by using different knitting, by using different spacer yarn material or both of them.

Figure 4:
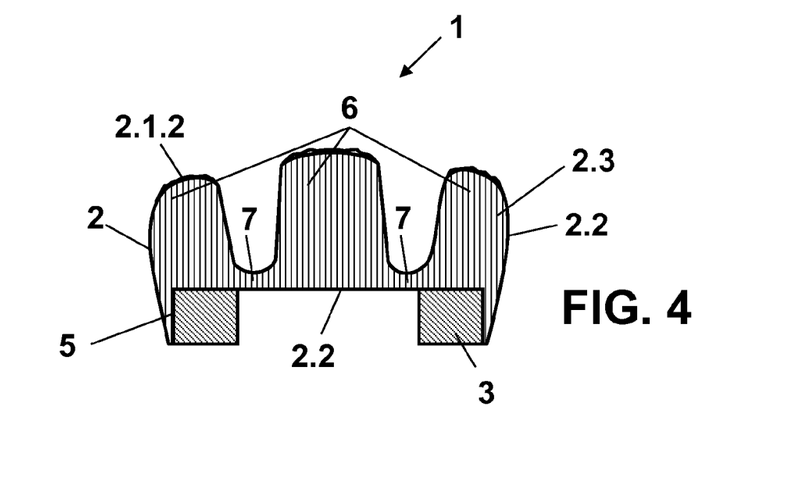
FIG. 4 shows a schematic view in detail of the cushioned armrest according to the section AA where it can be appreciated that the tridimensional fabric is divided into different cushion areas defined and delimited by correspondent change areas adjacent to them where the thicknesses of these change areas are lower than the thicknesses of such cushion areas.

In the particular embodiment shown in FIG. 4, the tridimensional fabric (2) comprises three different cushion areas (6) defined and delimited by two correspondent change areas (7) where the thicknesses of said change areas (7) adjacent to them are lower than the thicknesses of such three different cushion areas (6).

Figure 13:
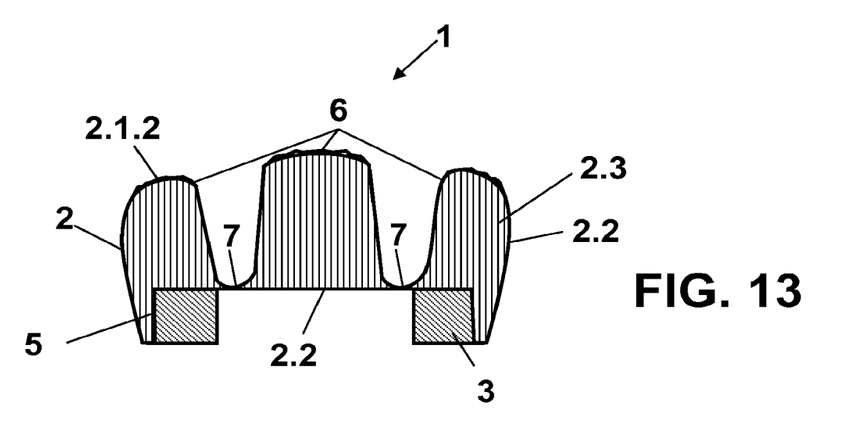
FIG. 13 shows a schematic view in detail of an alternative embodiment of the cushioned armrest according to the section AA where it can be appreciated that the tridimensional fabric is divided into different cushion areas defined and delimited by correspondent change areas adjacent to them by joining together the shaping knitted layer and the structural knitted layer at the change areas.

Referring to FIG. 13, this reduction of thickness of the change areas (7) with regard to the cushion areas (6) can be achieved for example by joining together the shaping knitted layer (2.1) and the structural knitted layer (2.2) at the change areas (7) in such a way that one layer is in contact with the other one. Therefore, in these cases, the change areas (7) can be even free of spacer yarns (2.3.2) of the core layer (2.3).

On the other hand, this reduction of thickness can be also achieved for example thanks to specific properties of the spacer yarns (2.3.2) of the core layer (2.3). Therefore in these cases, the spacer yarns (2.3.2) of the core layer (2.3) sews and brings the shaping knitted layer (2.1) closer to the structural knitted layer (2.2).

The cushion areas (6) can present the particularity of having different rigidities between them, in such a way it is possible to control the rigidity of every specific cushion area through varying the core layer (2.3) properties such as its elasticity or its thickness, for example by varying the distribution and/or disposition of the spacer yarns (2.3.2), their properties or both of them.

On the other hand, the cushion areas (6) can be differentiated one from each other by the different finishes of their shaping knitted layers.

The techniques for achieving the different finishes at these cushion areas (6) can be the same used in order to modify shaping knitted layer (2.1) described above in order to obtain the different finishing areas (2.1.2), however said finishing areas (2.1.2) may not necessarily coincide with the cushion areas (6).

Once the features of the self-supported cushion assembly (1) and all the elements which form its structure are described, the different ways considered of attaching said elements, particularly the ways of attaching the edges of the tridimensional fabric (2) to the frame assembly (3) is going to be explained below.

Figure 5:
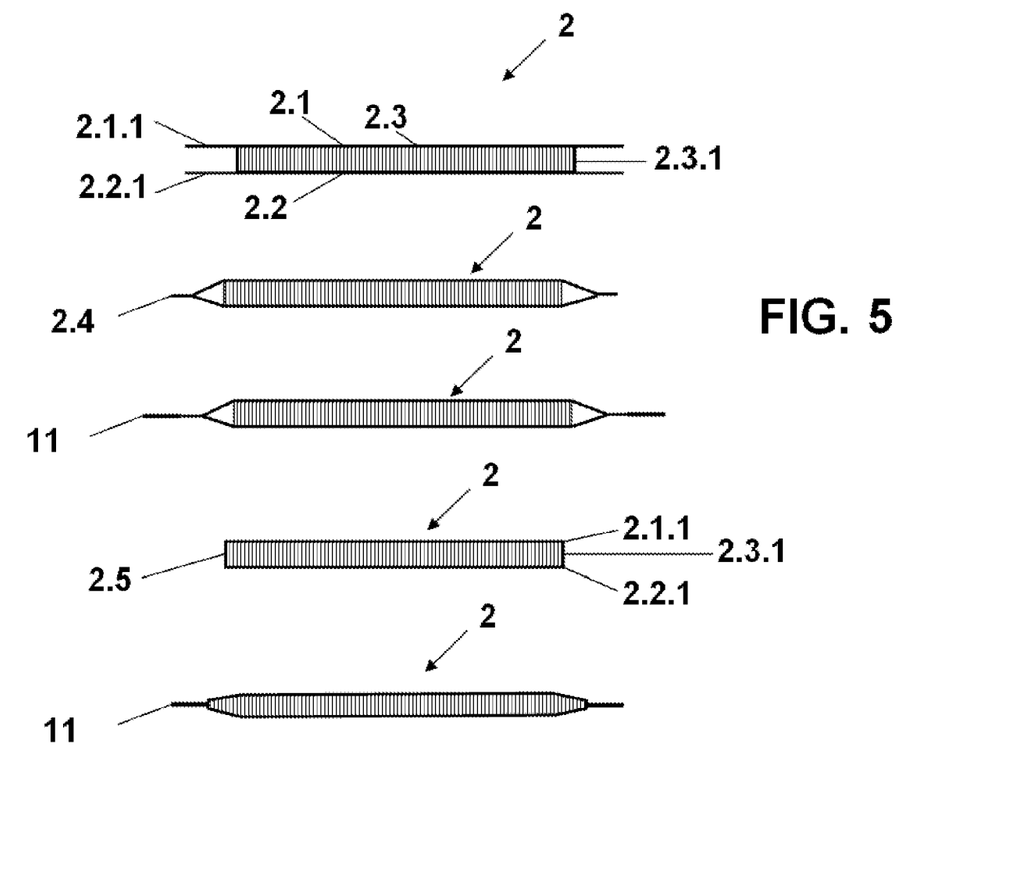
FIG. 5 shows several schematic views in section of the tridimensional fabric where it can be appreciated the different finishing options of the edges of the shaping knitted layer, of the core layer and of the back knitted layer which form part of the tridimensional fabric.

Firstly it is important to know how the edges of the different layers of the tridimensional fabric (2) can be, as it is shown in FIG. 5.

The first option considered in order to define the edges of the tridimensional fabric (2) is one in which an edge (2.1.1) of the shaping knitted layer (2.1) and the corresponding edge (2.2.1) of the structural knitted layer (2.2) protrude peripherally with regard to the corresponding edge (2.3.1) of the core layer (2.3).

The second option considered is one in which the edge (2.1.1) of the shaping knitted layer (2.1) and the corresponding edge (2.2.1) of the structural knitted layer (2.2) are fixed together forming a first sole edge (2.4).

The third option considered is one in which the edge (2.1.1) of the shaping knitted layer (2.1) and the corresponding edge (2.2.1) of the structural knitted layer (2.2) do not protrude peripherally with regard to the corresponding edge (2.3.1) of the core layer (2.3) in such a way the three edges (2.1.1, 2.2.1, 2.3.1) form a second sole edge (2.5).

In all of the cases described above, a reinforcing part (11) can be attached either to the edge (2.1.1) of the shaping knitted layer (2.1), to the corresponding edge (2.2.1) of the structural knitted layer (2.2), to the first sole edge (2.4) or to the second sole edge (2.5).

This reinforcing part (11) facilitates the operation of attaching the tridimensional fabric (2) to the frame assembly (3), because it reinforces the edges of the tridimensional fabric (2) and consequently it improves the handling of the tridimensional fabric (2).

Once the different options considered in order to define the edges of the tridimensional fabric (2) have been described, the different ways of attaching the tridimensional fabric (2) edges to the frame assembly (3) or to the frame assembly (3) and to the second frame (4) are described below.

These different ways of attaching the tridimensional fabric (2) will be selected in function of the available space in the interior vehicle part (10), the configuration of the frame assembly (4) and/or the thickness of the tridimensional fabric (2) itself.

Figure 6:
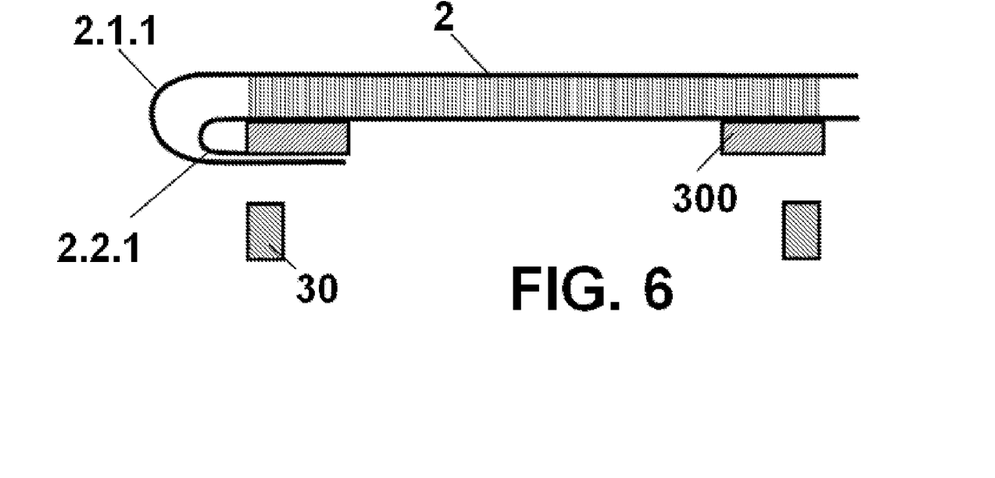
FIG. 6 shows a schematic view in section of the self-supported cushion assembly where it can be appreciated a first way of attaching of the tridimensional fabric to the rest of elements which form part of the self-supported cushion assembly. In this particular option, an edge of the shaping knitted layer and an edge of the structural knitted layer are attached to an additional frame part. Therefore in this option, the frame assembly comprises an additional frame part.

FIG. 6 shows a first way of attaching the tridimensional fabric (2) to an additional frame part (300). In this option, both, the edge (2.1.1) of the shaping knitted layer (2.1) and the edge (2.2.1) of the structural knitted layer (2.2) are attached to the additional frame part (300).

Figure 7:
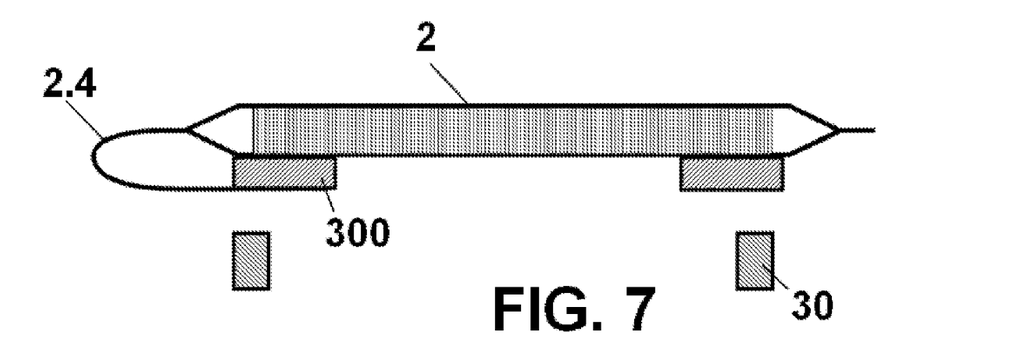
FIG. 7 shows a schematic view in section of the self-supported cushion assembly where it can be appreciated a second way of attaching of the tridimensional fabric to the rest of elements which form part of the self-supported cushion assembly. In this particular option, a first sole edge is attached to an additional frame part, where said first sole edge comprises an edge of the shaping knitted layer and an edge of the structural knitted layer joined together. Therefore in this option, the frame assembly comprises an additional frame part.

FIG. 7 shows a second way of attaching the tridimensional fabric (2) to an additional frame part (300). In this option, the first sole edge (2.4) is attached to the additional frame part (300).

Figure 8:
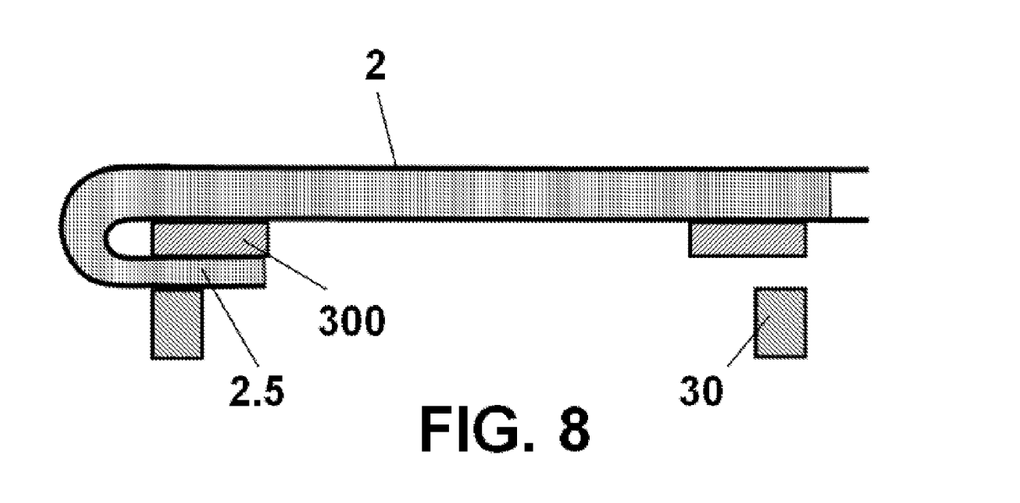
FIG. 8 shows a schematic view in section of the self-supported cushion assembly where it can be appreciated a third way of attaching of the tridimensional fabric to the rest of elements which form part of the self-supported cushion assembly. In this particular option, a second sole edge is attached to an additional frame part, where said second sole edge comprises an edge of the shaping knitted layer, an edge of the structural knitted layer and an edge of the core layer joined together. Therefore in this option, the frame assembly also comprises an additional frame part.

FIG. 8 shows a third way of attaching the tridimensional fabric (2) to an additional frame part (300). In this option, the second sole edge (2.5) is attached to the additional frame part (300).

Figure 9:
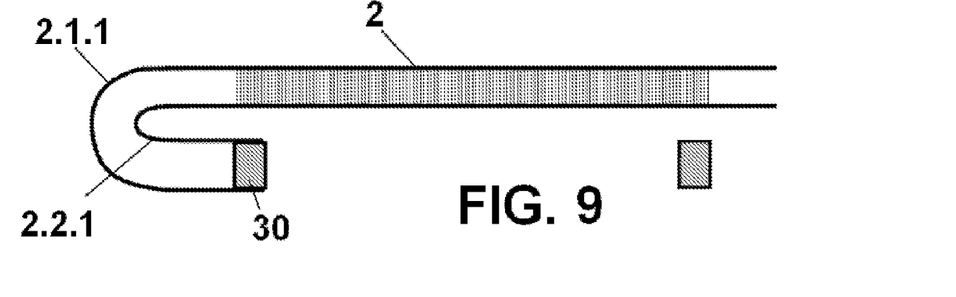
FIG. 9 shows a schematic view in section of the self-supported cushion assembly where it can be appreciated a fourth way of attaching of the tridimensional fabric to the rest of elements which form part of the self-supported cushion assembly. In this particular option, an edge of the shaping knitted layer and an edge of the structural knitted layer are attached to a part of the frame of the interior vehicle part. Therefore in this option, the frame assembly comprises a part of the frame of the interior vehicle part.

FIG. 9 shows a fourth way of attaching the tridimensional fabric (2) to the part (30) of the frame of the vehicle interior part (10.1). In this option, both, the edge (2.1.1) of the shaping knitted layer (2.1) and the edge (2.2.1) of the structural knitted layer (2.2) are attached to the part (30) of the frame of the vehicle interior part (10.1).

Figure 10:
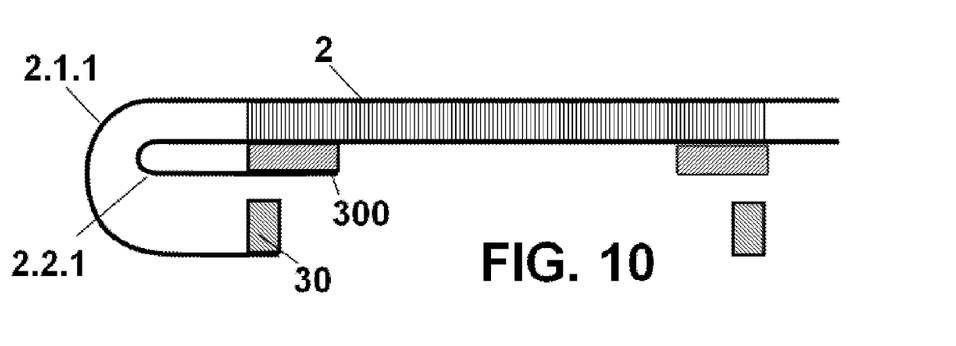
FIG. 10 shows a schematic view in section of the self-supported cushion assembly where it can be appreciated a fifth way of attaching of the tridimensional fabric to the rest of elements which form part of the self-supported cushion assembly. In this particular option, an edge of the shaping knitted layer is attached to a part of the frame of the interior vehicle part, and an edge of the structural knitted layer is attached to an additional frame part. Therefore in this option, the frame assembly comprises a part of the frame of the interior vehicle part and an additional frame part.

FIG. 10 shows a fifth way of attaching the tridimensional fabric (2) to the part (30) of the frame of the interior vehicle part (10.1) and to the additional frame part (300). In this option, the edge (2.1.1) of the shaping knitted layer (2.1) is attached to the part (30) of the frame of the interior vehicle part (10.1) and the edge (2.2.1) of the structural knitted layer (2.2) is attached to the additional frame part (300).

FIG. 11 shows a sixth way of attaching the tridimensional fabric (2) to the part (30) of the frame of the vehicle interior part (10.1). In this option, the first sole edge (2.4) is attached to the part (30) of the frame of the vehicle interior part (10.1).

FIG. 12 shows a seventh way of attaching the tridimensional fabric (2) to the part (30) of the frame of the vehicle interior part (10.1). In this option, the second sole edge (2.5) is attached to the part (30) of the frame of the vehicle interior part (10.1).

As it can be seen in FIGS. 11 and 12, a second frame is used in order to increase the stress T1 of the structural knitted layer (2.2). In this way the stress T1 and the stress T2 are different one from the other although both, shaping knitted layer (2.1) and structural knitted layer (2.2), are attached to the frame assembly (3) as a sole element.

The second frame (4) also can be used in any of the options shows in FIGS. 6 to 10 in order to apply an additional stress to the tridimensional fabric (2) and more particularly, to the structural knitted layer (2.2).

The invention claimed is:

1. A self-supported cushion assembly for an interior vehicle part comprising a tridimensional fabric assembled to a frame assembly, the tridimensional fabric comprising:
 a structural knitted layer attached to the frame assembly and tightened in order to support any effort commonly exerted on the self-supported cushion assembly during its normal use,
 a shaping knitted layer attached to the frame assembly in order to shape the self-supported cushion assembly,
 a core layer having spacer yarns which connect the shaping knitted layer with the structural knitted layer,
 the structural knitted layer, the shaping knitted layer, and the core layer being knitted together as a sole element,
 the tridimensional fabric has attaching means in order to attach it to the frame assembly, wherein,
 the structural knitted layer being attached to the frame assembly with a tightening stress T1, the shaping knitted layer being attached to the frame assembly with a shaping stress T2 wherein T1 is greater than T2; wherein the tridimensional fabric comprises two different cushion areas defined and delimited by correspondent change areas where the shaping knitted layer is connected to the structural knitted layer where the thicknesses of the change areas adjacent to the cushion areas are lower than the thicknesses of said cushion areas;
 wherein the structural knitted layer and the shaping knitted layer are joined together at the change areas in such a way, one layer is in contact with the other one.

2. The self-supported cushion assembly for an interior vehicle part according to claim 1, wherein the frame assembly is a part of the frame of the interior vehicle part.

3. The self-supported cushion assembly for an interior vehicle part according to claim 1, wherein the frame assembly is an additional frame part which is mounted on the interior vehicle part.

4. The self-supported cushion assembly for an interior vehicle part according to claim 1, wherein the frame assembly is a part of the frame of the interior vehicle part and an additional frame part which is mounted on the interior vehicle part.

5. The self-supported cushion assembly for an interior vehicle part according to claim 2 or 3 or 4, further comprising a second frame which is mounted on the frame assembly in order to apply an additional stress to the tridimensional fabric where said additional stress is modifiable by varying the relative position of the second frame with regard to the frame assembly.

6. The self-supported cushion assembly for an interior vehicle part according to claim 1, further comprising a support element which is assembled between the tridimensional fabric and the frame assembly in order to locally reinforce the tridimensional fabric.

7. The self-supported cushion assembly for an interior vehicle part according to claim 1, wherein an edge of the shaping knitted layer and an edge of the structural knitted layer protrude peripherally with regard to an edge of the core layer.

8. The self-supported cushion assembly for an interior vehicle part according to claim 7, wherein the edge of the shaping knitted layer and the edge of the structural knitted layer are fixed together forming a first sole edge.

9. The self-supported cushion assembly for an interior vehicle part according to claim 1, wherein an edge of the shaping knitted layer and an edge of the structural knitted layer do not protrude peripherally with regard to an edge of the core layer in such a way the three edges form a second sole edge.

10. The self-supported cushion assembly for an interior vehicle part according to claim 7, wherein a reinforcing part is attached to the edge of the shaping knitted layer, to the edge of the structural knitted layer, to a first sole edge or the second sole edge.

11. The self-supported cushion assembly for an interior vehicle part according to claim 1, wherein the attaching means of the tridimensional fabric to the frame assembly are selected between profiles, clips, infrared, ultrasound, hooks, and peripheral frame and reinforcing holes.

12. The self-supported cushion assembly for an interior vehicle part according to claim 1, wherein the core layer of two cushion areas have different thicknesses, different elasticities or both of them.

13. The self-supported cushion assembly for an interior vehicle part according to claim 1, wherein two cushion areas of the shaping knitted layer have different finishes.

14. The self-supported cushion assembly for an interior vehicle part according to claim 1, wherein at least one spacer yarn of the core layer at the change areas is sewn to bring the shaping knitted layer closer to the structural knitted layer.

15. The self-supported cushion assembly for an interior vehicle part according to claim 1, wherein the finishing of the shaping knitted layer has an additional finishing treatment by screen printing, ink printing, polyurethane or silicone spraying, flocking, or by a combination of these methods on specific areas.

16. The self-supported cushion assembly for an interior vehicle part according to claim 1, wherein the shaping knitted layer has different areas with different features by using different knitting, by using different yarn material or both of them.

17. The self-supported cushion assembly for an interior vehicle part according to claim 15, wherein the shaping knitted layer is divided into two finishing areas.

18. The self-supported cushion assembly for an interior vehicle part according to claim 1, wherein the tridimensional fabric has a thickness greater than 20 mm.

19. The self-supported cushion assembly for an interior vehicle part according to claim 16, wherein the shaping knitted layer is divided into two finishing areas.

* * * * *